United States Patent [19]

Takata

[11] Patent Number: 4,479,444
[45] Date of Patent: Oct. 30, 1984

[54] MANOMETER APPARATUS AND SYSTEM FOR DISTRIBUTION OF LIQUID FERTILIZERS

[75] Inventor: Harry H. Takata, Minneapolis, Minn.

[73] Assignee: Ag-Chem Equipment Co., Inc., Minneapolis, Minn.

[21] Appl. No.: 431,160

[22] Filed: Sep. 30, 1982

[51] Int. Cl.³ .............................................. A01C 23/02
[52] U.S. Cl. ...................................................... 111/7
[58] Field of Search ........................... 111/6, 7, 34, 73; 239/469, 74, 172, 565, 717, 718, 961, 553.5, 66, 76, 193

[56] References Cited

U.S. PATENT DOCUMENTS

| | | | |
|---|---|---|---|
| 2,782,739 | 2/1957 | Freer | 111/7 |
| 2,794,407 | 6/1957 | Wist et al. | 111/7 |
| 2,857,863 | 10/1958 | Jessen | 111/7 |
| 2,973,728 | 4/1961 | Garretson | 111/6 |
| 3,139,848 | 7/1964 | Welty | 111/7 |
| 3,848,635 | 11/1974 | Scheffler, Jr. | 137/610 |
| 3,964,639 | 6/1976 | Norris et al. | 221/278 |
| 4,024,822 | 5/1977 | Ross et al. | 111/34 |
| 4,202,283 | 5/1980 | Wiesboeck | 111/6 |
| 4,264,242 | 4/1981 | Lecomte | 239/565 |
| 4,284,243 | 8/1981 | Shaner | 239/469 |

FOREIGN PATENT DOCUMENTS

| | | | |
|---|---|---|---|
| 1097149 | 3/1981 | Canada | 111/7 |
| 424114 | 1/1926 | Fed. Rep. of Germany | 111/7 |

Primary Examiner—Robert A. Hafer
Assistant Examiner—D. D. DeMille
Attorney, Agent, or Firm—Orrin M. Haugen; Thomas J. Nikolai; Douglas L. Tschida

[57] ABSTRACT

An improved fertilizer distribution system including a bottom fed distributor manifold for insuring the agitation of the liquid fertilizers and a liquid manometer indicating relative internal pressure. Detachable inlet and outlet assemblies permit the changing of orifices mounted therein so as to accommodate system requirements. The manifold chamber and the individual outlet assemblies are open to the atmosphere to facilitate drain down and flow through the outlet assemblies.

4 Claims, 2 Drawing Figures

MANOMETER APPARATUS AND SYSTEM FOR DISTRIBUTION OF LIQUID FERTILIZERS

TECHNICAL FIELD

The present invention relates to the field of agricultural liquid distribution systems and in particular to apparatus for regulating the flow of suspension and liquid fertilizers via a manometer containing distributor manifold.

BACKGROUND OF THE INVENTION

Soil treatment systems for the distribution of liquid fertilizers and various other soil treatment materials having long been known and are often times combined with various other farm equipment so as to perform more than one operation at a time; for example, combining soil cultivation or tillage with the distribution of the treatment materials permits the distribution of the treatment materials in a subsurface fashion while the soil is being treated. In the typical arrangement, the soil treatment equipment is at least configured so as to provide for a motor driven vehicle having an associated storage tank, positive pressure pump means for supplying the suspension or liquid treatment materials to a distributor manifold and a plurality of conduits coupled to the manifold for distributing the treatment materials to the soil at a desired rate.

A limiting factor to such combined configurations, however, arises with respect to the rate of distribution of the liquid matter or, in other words, the amount thereof per acre. Specifically, due to the necessary slow speeds that are employed in the tillage operations, the rate of distribution of the liquid treatment materials becomes very critical and very difficult to regulate. While various attempts have been made, and which will be discussed below, to regulate the rate of distribution, such equipment has proved ineffective and/or does not provide the operator with sufficient monitoring capability, other than the actual visual inspection of the liquid distribution equipment. With the increasing costs of the treatment materials and an ever present desire to optimize yield, such systems are less than optimum and accordingly the need for the present invention.

For more information though with respect to previously known systems and apparatus, attention is directed to U.S. Pat. Nos. 4,284,243; 4,202,283; and 4,024,822. Upon reference thereto, though, it is to be noted that the present invention differs in many respects and in particular with respect to the configuration of the distributor manifold and the ability to now monitor the relative distribution pressure and thereby detect leaks, obstructed orifices or conduits, etc. Further, the present invention provides for a more uniform distribution at the low speeds and over a wide range of operating pressures, such that predictable, controllable and uniform rates are achieved at each nozzle for a system having a plurality of interchangeable inlets and outlets.

Such ends are now achieved, in art, via a novel distributor manifold that employs no moving parts in its regulation, division and agitation of the treatment materials. In particular, the present manifold comprises a bottom feed chamber having a centered inlet orifice and a plurality of outlet orifices spaced thereabout on the periphery of the manifold, such that the treatment material is supplied to the chamber at a relatively high or "super-pressure." Agitation is achieved via the bottom inlet, although a baffle assembly may be used too, and operator monitoring is enabled via a transparent liquid manometer that is coupled to the chamber and which indicates the internal pressure and variations thereof (e.g. plugged outlets). Further, the present invention provides an associated vent mechanism for each outlet orifice so as to maintain a uniform pressure differential across each outlet orifice and thereby equal and uniform flow rates at each outlet orifice. Additionally, the venting of the manifold chamber via the manometer permits the complete draining of the chamber, should the supply flow be shut-off.

These objects, the configuration of the present apparatus and system and various other objects and advantages will, however, become more apparent upon a reading of the following description and upon reference to the following drawings. It is to be recognized, though, that the present invention is hereinafter described with respect to its presently preferred embodiment and which is not to be interpreted to the exclusion of those various other embodiments or configurations which do not depart from the spirit and scope hereof.

SUMMARY OF THE INVENTION

The present invention comprises apparatus and a system for distributing to a plurality of outlet ports, liquid fertilizer supplied from a storage tank by a single positive pressure pump, through a novel distributor manifold. The distributor manifold generally includes means for preventing settlement of solids and an unobstructed flow of the fertilizer to the distributor chamber, means for visually indicating to the equipment operator that the liquid is reaching the distributor manifold properly, and means for insuring a uniform and equal pressure gradient across each outlet port and a consequent equal flow rate through each of the flexible conduits that connect the distributor manifold to soil injection nozzles at associated soil penetration knives.

In a particular embodiment of the present invention, the distributor manifold comprises a bottom fed chamber wherein the inlet port is centered about a plurality of outlet ports and wherein each of the inlet and outlet ports contain an interchangeable orifice. The inlet and outlet orifices are sized so as to maintain a reasonably static pressure in the chamber of the distributor manifold while delivering the desired flow rate. Agitation of liquid suspensions is insured via the bottom feed arrangement into the chamber. Additionally, a transparent liquid manometer extends upward from the chamber so as to provide the operator with a visible indication of the internal pressure and relative changes thereto. Furthermore, vent holes are associated with each of the outlet ports so as to provide for a uniform pressure gradient thereacross from the inside of the chamber to the delivery conduit.

DESCRIPTION OF THE PREFERRED EMBODIMENT

Figure 1:
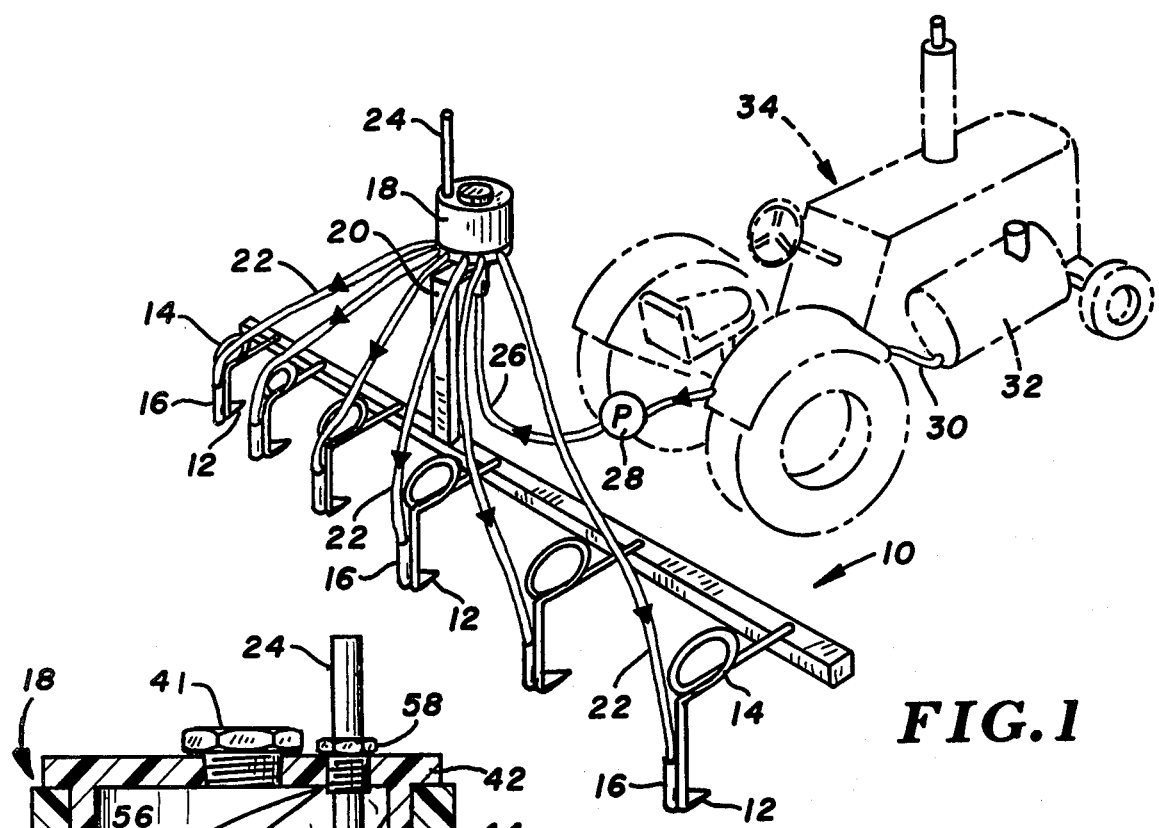
FIG. 1 shows a perspective view of a typical subsurface distribution system containing the present novel distributor manifold.

Referring now to FIG. 1, a perspective view is shown of a typical system containing the present invention and which includes a soil penetrating implement 10 such as a cultivator having a plurality of cultivator blades or knives 12 mounted on spring shanks 14. A fertilizer injection assembly 16 is, in turn, coupled to each blade 12 such that the liquid treatment materials are applied thereby in a subsurface manner.

Mounted above the implement 10 is a distributor manifold 18 which may be mounted on implement 10 in any suitable fashion, as suggested by support 20, and which is connected to each of the injector assemblies 16 by a plurality of flexible conduits 22, which for purposes of illustration also indicate liquid flow direction by associated arrows shown as a part thereof. Finally, a liquid manometer 24 extends upward from distributor 18 and provides the operator with a visible indication of the relative internal pressure and the proper operation of the application equipment.

Liquid is supplied to the distributor 18 through a flexible conduit 26 by a positive pressure pump (P) 28 that is connected by another flexible conduit 30 to a storage tank 32 containing the liquid treatment materials (i.e. suspension fertilizer with various blends of nitrogen, phosphorous and potassium. As shown, a tractor 34 tows the implement 10 and powers pump 28. It is to be recognized though that tank 32 could, of course, be carried by implement 10 or towed separately or, for that matter, all of the elements could be combined in one implement, if desired.

Figure 2:
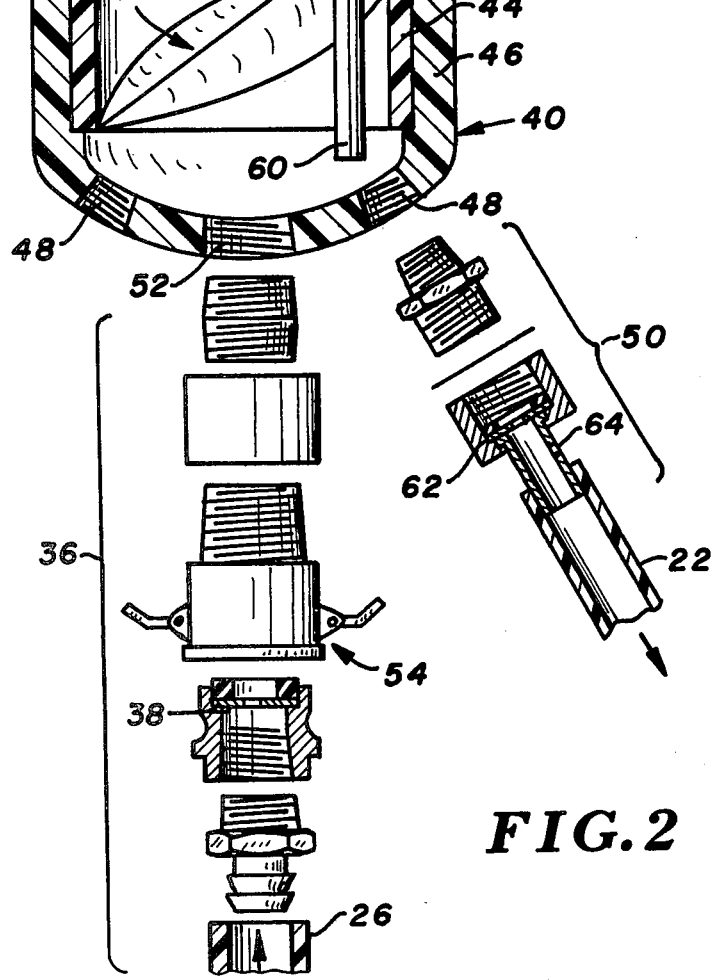
FIG. 2 shows a partially cross-sectional view of the present distributor manifold and its associated inlet orifice assembly and one of the plurality of outlet orifice assemblies.

Referring next to FIG. 2, a more detailed and partially sectioned view is shown of the distributor manifold 18 and liquid manometer 24. Before describing the details thereof though, it is to be recognized that while FIG. 1 shows a manifold 18 having six outlet conduits 22, it is contemplated that for most configurations anywhere from five to eight or more outlet ports would typically be used. The number of outlets primarily being determined by the number of rows that the implement 10 would be able to accommodate. Additionally, it is to be noted that FIG. 1 is somewhat misleading as to the placement of the outlet conduits 22 in that they are typically mounted about the bottom of the distributor manifold 18, equidistant from one another and the center inlet conduit 26. However, by referring to FIG. 2, such details should become more apparent.

Therefore, attention is now directed to FIG. 2 and wherein the detailed structure of not only the distributor manifold 18 but also the inlet metering orifice and coupler assembly 36 and outlet metering orifice and coupler assembly 50 are shown in greater detail. Generally, the distributor manifold 18 comprises a container 40 having a hollow chamber that is enclosed by a lid 42 having a flange 44 that interfits with the side wall 46 of the container 40—all of which are preferably cylindrical. The bottom of container 40 has formed therein a plurality of outlet ports 48 tapped to receive the outlet assemblies 50 and for removably connecting the conduits 22 thereto. A tapped inlet aperture 52 is also formed in the bottom center of the container 40 and is detachably connected to the inlet conduit 26 via a cam release fitting 54 and other associated elements of the inlet assembly 36. Directly opposite and above the inlet port 52, where errosive wear may occur from in-rushing treatment materials, a wear resistant but expendable and easily replaceable plug 40 is also provided.

It is also to be noted that the lid 42 includes a baffle 56 (shown in various positions and deflection angles as determined by internal pressures and liquid flow as it enters from the inlet coupler 54) to deflect the inlet stream and provide mixing and agitation of the liquid treatment materials so as to avoid settlement of the material in container 40. Alternatively, this baffle 56 may be deleted, since agitation is achieved by the mere fact of the bottom feed arrangement. Further, it is to be noted that lid 42 is slidably contained by the container 40 and secured thereto by cement so as to also enable the variation of the internal chamber dimensions, during manufacture. Again, too, though it is too be recognized that the container 40 could possible be molded as a unitary structure.

Before continuing, if additional information is desired with respect to the detachable coupler 54, attention is directed to co-pending U.S. patent application Ser. No. 411,633, entitled SELFALIGNING COUPLER FOR FLUID TRANSMITTING CONDUITS, and which is assigned to the present assignee. As mentioned, it is also to be noted that depending upon the application and number of outlet nozzles the orifice containing metering discs 38 and 62 of the inlet and outlet assemblies 50 (to be described hereinafter) may be interchanged so as to incorporate various orifices of differing sized apertures in the inlet and outlet ports 52 and 48. Typically though the inlet orifice is sized so as to have a corresponding relation to a desired chamber pressure and consequent outlet pressure at each outlet port 48, thereby permitting a number of different predetermined flow rates, given a predetermined constant speed. For additional information with respect to the sizing of these orifices and a similar series/parallel arrangement, attention is directed to U.S. patent application Ser. No. 431,388, entitled MODULAR LOW PRESSURE STRIP SPRAYING APPARATUS AND SYSTEM, and which too is assigned to the present assignee.

Returning to the description of FIG. 2, attention is now directed to the fact that a liquid manometer 24 is connected to the lid 42 via a coupling 58. The manometer 24 may comprise a simple transparent tube having a lower end 60 extending substantially to the bottom of container 40, so that under pressure, liquid in chamber 40 may rise in the tube, after expulsion of air from the upper portion of the container 40 and be observed by the tractor operator. However, the liquid manometer 24 may comprise any one of various other known types of manometers, which may or may not extend the bottom of the container. Generally, though it is the purpose thereof to provide a relative pressure indication to the equipment operator as to the internal chamber pressure, which indication was heretofore not available. Rather, previously if one or more of the outlet conduits 22 became plugged, an operator might continue to operate the equipment without knowing of the plugged condition for an undue amount of time and which did not provide for optimum soil treatment. Another feature of the manometers 24 is that an immediate indication is had should an outlet be plugged due to an increase internal pressure in chamber 40 since the constant and rise in the liquid in the manometer 24, since the constant inlet flow is now forced to exit from one less outlet. It should be noted too that the liquid manometer 24 serves a further purpose in that when the flow in the supply conduit 26 is intentionally shut off, the venting of the distributor manifold chamber permits the complete draining thereof so that sedimentation and the subsequent possibility of one or more plugged outlet orifices is avoided.

A further special feature of the outlet assemblies 50 will also now be pointed out and which consists of a vent hole 64, bored in the side thereof. Specifically, each of these assemblies 50 is provided with one or more flow regulating or metering orifice 62 having an aperture of a predetermined size and shape formed therethrough upstream of one or more vent holes 64, that provides communication to the ambient atmospheric pressure. Such a vent 64 is desirous, in that it has been found that, without these vent holes, when three or four of the flexible outlet conduits 22 became filled with liquid, the head or back-pressure of the liquid created negative pressures (or a siphon effect) at the down stream sides of the metering orifices 62. This pressure differential, in turn, then interfered with the intended flow of the liquid, and was indicated by a drop in the pressure in container 40, as sensed by manometer 24. Thus, by providing vent holes 64, the negative pressure and pressure differential is avoided and a uniform pressure is achieved at each outlet port so as to ensure proper distribution of the liquid and a normal indication of pressure at manifold 24.

From the above it will be evident that the invention comprises a liquid fertilizer distribution system including a distributor manifold having a bottom inlet means for agitating the treatment materials and reducing the settlement of the material; vent means for preventing undesired pressure differentials across the distributor outlet ports by downstream liquid heads; and visual relative pressure indicating means by which the equipment operator may observe its satisfactory operation. While these and other characteristics and advantages of the invention have been set forth in the foregoing description, together with details of its structure, its function and the operation thereof, the believed novel features thereof are particularly pointed out in the appendant claims. It is to be recognized though that the above disclosure is illustrative only, and that changes may be made in detail, especially in matters of shape, size, and arrangement of parts, within the principle of the invention and without departing from the spirit and scope of the following claims. It is therefore anticipated that the present invention and the protection granted hereby includes all such equivalent structures within the ambit of the following claims.

What is claimed is:

1. A distributor manifold for liquid and suspension fertilizers comprising in combination,
    a closed container;
    inlet means receiving a fertilizer pumped from a supply tank and including a replaceable liquid metering disc having an aperture formed therethrough of a first predetermined size and shape for regulating the pressure at which said fertilizer is supplied to said container;
    a plurality of liquid outlets at the bottom of said container, each containing a replaceable liquid metering disc having an aperture of a second predetermined size and shape, the combination of said inlet and outlet discs providing a range of possible distribution rates, each distribution rate depending upon the pressure internal to said distributer;
    a visual direct reading manometer vented to the atmosphere and extending upwardly from the top of said container for displaying the pressure interior thereto; and
    means in each of said outlets for venting said outlets to the ambient atmosphere, whereby said liquid is substantially equally distributed via each of said outlets at a uniform outlet pressure and rate.

2. A distributor manifold according to claim 1 further including means for supporting said container above the surface of soil being treated and means connected to said outlets for discharging said fertilizer in a subsurface fashion.

3. A distributor manifold according to claim 1 further including a resilient planer baffle in said container opposed to said inlet means for deflecting inlet liquid flow at varying angles relative to the pressure of the inlet fertilizer, thereby preventing the settling of suspended matter in said fertilizers.

4. An apparatus for conveying a supply tank containing a quantity of liquid or suspension fertilizers and for distributing the fertilizer in a subsurface fashion via a plurality of conduits coupled to a plurality of injectors, a distributor manifold intermediate said supply tank and said injectors comprising in combination:
    a hollow enclosed container having an inlet port coupled via a pump to said supply tank and including a plurality of outlet ports coupled to said conduits;
    a visually readable manometer vented at one end to the atmosphere and opening at the other end to the inside of said container for displaying the pressure interior thereto and thereby the flow rate of fertilizer to each of said injectors;
    an inlet liquid metering disc replaceably mounted in said inlet port and having an aperture of a predetermined fixed size and shape for regulating the pressure of the fertilizer admitted to said container;
    a plurality of replaceable outlet liquid metering discs mounted in said outlets, each outlet disc having an aperture of a predetermined fixed size and shape for regulating the pressure of the fertilizer distributed to an associated one of said injectors; and
    at least one vent hole in each outlet downstream of each of said outlet's orifices, whereby said fertilizer is uniformly distributed to each injector at atmospheric pressure and at a rate depending upon the pressure internal to said distributor.

* * * * *